June 27, 1950

R. C. WEBB 2,513,221

REGISTER CORRECTION FOR TELEVISION

Filed July 1, 1948

INVENTOR
RICHARD C. WEBB
BY Oliver J. Mitchell
ATTORNEY

Patented June 27, 1950 2,513,221

UNITED STATES PATENT OFFICE 2,513,221

REGISTER CORRECTION FOR TELEVISION

Richard C. Webb, Princeton, N. J., assignor to Radio Corporation of America, a corporation of Delaware Application July 1, 1948, Serial No. 36,395

1 Claim. (Cl. 250—160)

This invention relates to television systems and more particularly, but not necessarily exclusively, to correction of distortion which prevents accurate registration of component images when superposed.

In black and white television a certain amount of distortion within the image raster can be tolerated or is unnoticeable, but when a plurality of rasters are superposed as is customary in simultaneous color television, the same degree of distortion becomes objectionable because the individual distortions seldom occur at corresponding parts of the image and the lack of registration becomes apparent. Camera tubes, such as the "Orthicon" and "Image-Orthicon" types and the coils associated therewith, are very carefully made and usually include shielding arrangements to insure uniform flux distribution and axially symmetric fringing flux in which the photocathode is located. Other types of tubes, wherein the scanning beam is angularly disposed to the target, produce a "keystone" effect and various arrangements for correction thereof are known. However, in spite of all such precautions there are dissimilarities in tubes, electrodes, and connecting leads which cause unpredictable local distortions, especially near the edges of the image raster. Consequently, when two or more images are superposed, such local distortions are accentuated and become objectionable.

The presence of such local distortions may also be objectionable in connection with a single tube, for instance, when a very accurate and undistorted image raster is desired.

The primary object of the present invention is to correct or compensate such local distortions.

A related object is to correct or compensate distortions in one or more of a plurality of television tubes so that the superposed images will register over the entire picture area.

Broadly, these objects are accomplished by disposing a number of elements about that section of the tube where such elements can effect controllable modifications in the field of force within the tube. For instance, with an "Image-Orthicon" tube such elements may be magnetic plugs disposed in the fringing flux of the focus coil, or they may be electrostatic elements disposed around the periphery of the image section of the tube. In any event the effect of each such element is made individually adjustable so that corrections can be applied to various parts of the image without appreciably affecting other parts.

A further object of the invention is to arrange the adjusting apparatus to be compact and quickly manipulated at a point where the effects of the adjustments can readily be observed.

Other objects and advantages of the invention will be apparent from the following description of two embodiments thereof, in connection with the accompanying drawings, in which.

Figure 1:
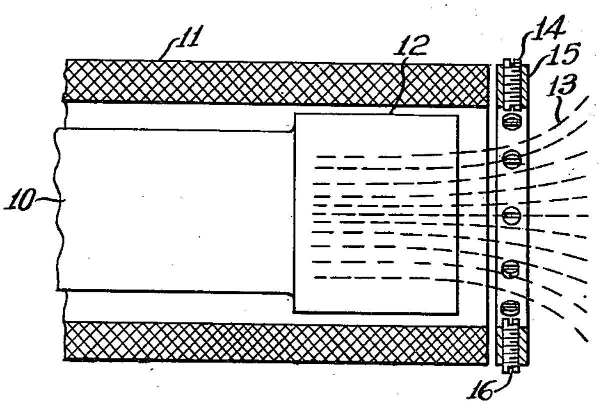
Figure 1 is an illustration of one embodiment of the invention using magnetic plugs as deflecting elements.

Referring to Figure 1, reference character 10 indicates a camera tube surrounded by a focus coil 11. The end portion 12 of the camera tube is the image section thereof and is located near the end of coil 11, the fringing flux of which is indicated by dotted lines at 13. Disposed within such flux are a number of elements 14 of magnetic material, which may be supported in a non-magnetic ring 15 adjacent the ends of the image section 12 and coil 11. The magnetic elements 14 may have any one of various forms and may be supported in any suitable manner so long as they are adjustable toward and away from the flux 13. In the form shown, the elements are threaded plugs having depressions or slots 16 in one or both ends by which they can be screwed in or out of threaded holes in ring 15 and thereby adjusted individually relative to the flux 13. The plugs 14 may be of temporary magnetic material, such as soft iron, or they may be of permanent magnet material and magnetized so that the ends of each plug are north and south poles respectively. In the latter case the plugs should be made reversible end-to-end in the ring 15 so that either the north or the south pole of any plug can be presented to the flux 13.

Figure 2:
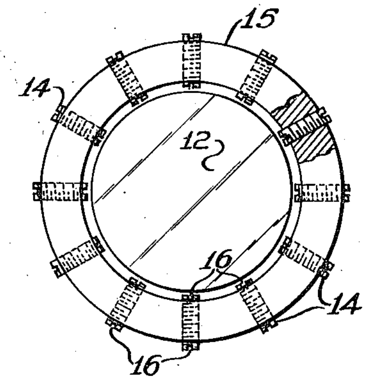
Figure 2 is an end view of Figure 1.

The operation of the arrangement shown in Figures 1 and 2 is as follows. The tube 10 is put into operation so that it provides an electron stream representing an image in the image section 12 and the signals produced thereby are reproduced in any convenient manner. The plugs 14 may be symmetrically positioned with respect to the axis of tube 10. If any part of the raster shows distortion of the image, the plug or plugs nearest to that part are adjusted toward or away from the fringing flux 13 until the distortion is corrected. Ordinarily three tubes such as 10 are used simultaneously, one for each of the colors, red, green, and blue. The three tubes are optically registered accurately but when the images are superposed, local electrical distortions become more evident due to the differences in color and the possibility that a distortion in one tube may be in the opposite direction from a similar distortion in another tube. The plugs 14 of the tube or tubes which appear to be distorted, are then adjusted for such part of the image raster until an acceptable registration of all three colors is obtained. Soft iron plugs will concentrate the flux within themselves, the effect thereof being more pronounced as the plugs are moved toward the center of ring 15. If permanently magnetized plugs are used they will have a similar effect for one polarity, but will have the opposite effect, i. e. a dispersion of flux, when the plugs are reversed end-to-end.

Figures 3, 4, 5, 6:
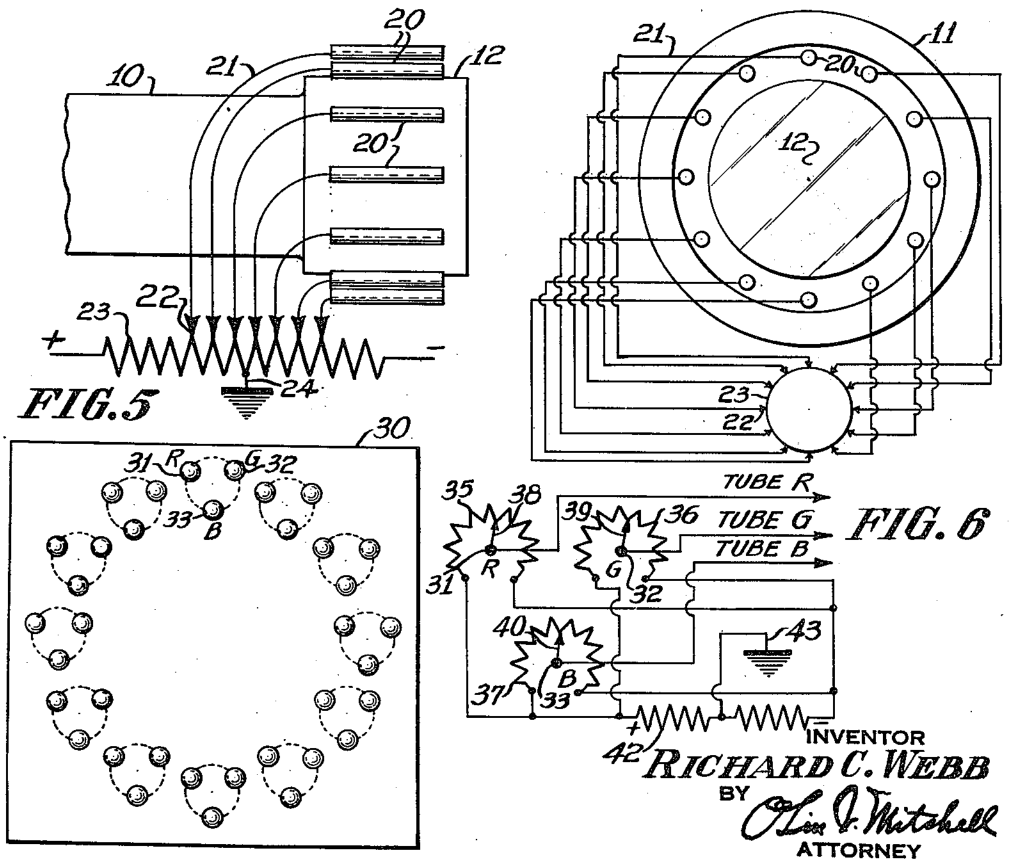
Figure 3 illustrates another embodiment using electrostatic elements.
Figure 4 is an end view of Figure 3 with modification.
Figure 5 shows control apparatus for three tubes according to Figures 3 and 4.
Figure 6 shows circuit details for the apparatus of Figure 5.

Figures 3 and 4 illustrate a second embodiment of the invention wherein electrostatic elements are used instead of magnetic elements. In this embodiment the image section 12 of tube 10 is surrounded by a number of electrostatic members 20 which may be of any convenient shape or size to suit the particular tube. In practice the members 20 are made small enough to be inserted between tube 10 and coil 11 without change of design. For instance, they may be of thin sheet metal or foil. The focus coil has been omitted from Figure 3, but in Figure 4 it surrounds the members 20, the proportions being exaggerated for clearness. Each element or member 20 is connected by a conducting lead 21 to an adjustable tap 22 on a potentiometer 23 which preferably is grounded at its midpoint 24. A source of D. C. potential may be connected to the ends of potentiometer 23 as indicated by the plus and minus signs. For convenience the taps 22 in Figure 3 are shown in line but it should be understood that they are arranged to pass each other so that any voltage available in potentiometer 23 may be applied to any one of the elements 20. Such an arrangement is illustrated in Figure 4 wherein the potentiometer 23 is shown in end view with the taps 22 disposed circumferentially.

Figures 5 and 6 show another potentiometer arrangement wherein the adjusting apparatus for three camera tubes equipped with elements 20 (as shown in Figures 3 and 4) is arranged on a panel 30 for convenience. Control knobs 31, 32, and 33 of three potentiometers 35, 36, and 37 are arranged in a group and adjustable taps 38, 39, and 40 thereof are connected respectively to corresponding elements 20 of the three tubes, as indicated in Figure 6. For instance, the element 20 shown at the 12 o'clock position (Figure 4) of the red tube is connected to tap 38; the 12 o'clock element of the green tube is connected to tap 39; and the 12 o'clock element of the blue tube is connected to tap 40. Thus the corresponding elements of the three tubes can be controlled by a group of closely adjacent potentiometers. Additional groups of potentiometers are provided on panel 30 for the respective electrostatic elements and preferably are disposed in a circle corresponding to the circle of elements 20 in Figure 4.

In Figure 6 the potentiometers 35, 36, and 37 are connected in parallel across a source of D. C. potential 42, the neutral point of which is grounded at 43. The other groups of potentiometers may be similarly arranged and connected, and source 43 may be common to all groups. The potentiometers may have high resistance so that all of them connected in parallel will require little current.

The operation of the arrangements shown in Figures 3 to 6, inclusive, is as follows. The relative distortions of the three tubes are noted when all of the electrostatic elements 20 of all the tubes have the same potential, preferably neutral. Where distortion is noticeable, the potentials of one or more of elements 20 of one or more of the tubes are varied in either a positive or a negative direction with respect to common ground until the distortions are corrected and the three images are properly registered.

The apparatus described and the embodiments shown in the drawings are merely illustrative, for it is obvious that substitutions and modifications can be made to suit particular requirements.

What is claimed is:

An apparatus for correcting and compensating for distortions in the influencing field in the vicinity of a photocathode comprising radially disposed electrostatic members of conductive material, said electrostatic members being mounted externally with respect to the region of the photocathode, and means for selectively applying different potentials to each of said electrostatic members.

RICHARD C. WEBB.

REFERENCES CITED

The following references are of record in the file of this patent:

UNITED STATES PATENTS

| Number | Name | Date |
|---|---|---|
| 1,985,093 | Hehlgans | Dec. 18, 1934 |
| 1,995,376 | Campbell | Mar. 26, 1935 |
| 2,004,099 | Bedford | June 11, 1935 |
| 2,157,182 | Maloff | May 9, 1939 |
| 2,165,803 | Maloff | July 11, 1939 |
| 2,244,748 | Walker | June 10, 1941 |
| 2,258,643 | Gier et al. | Oct. 14, 1941 |
| 2,455,676 | Hillier | Dec. 7, 1948 |